Aug. 27, 1929.                G. R. MUMMA                1,725,820
QUICK ACTION FLOAT VALVE
Filed Sept. 12, 1928
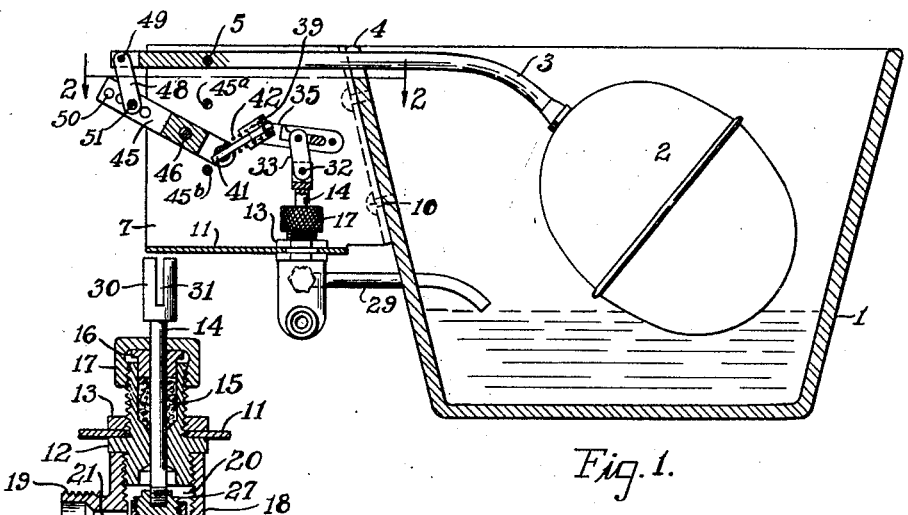
Fig.1.
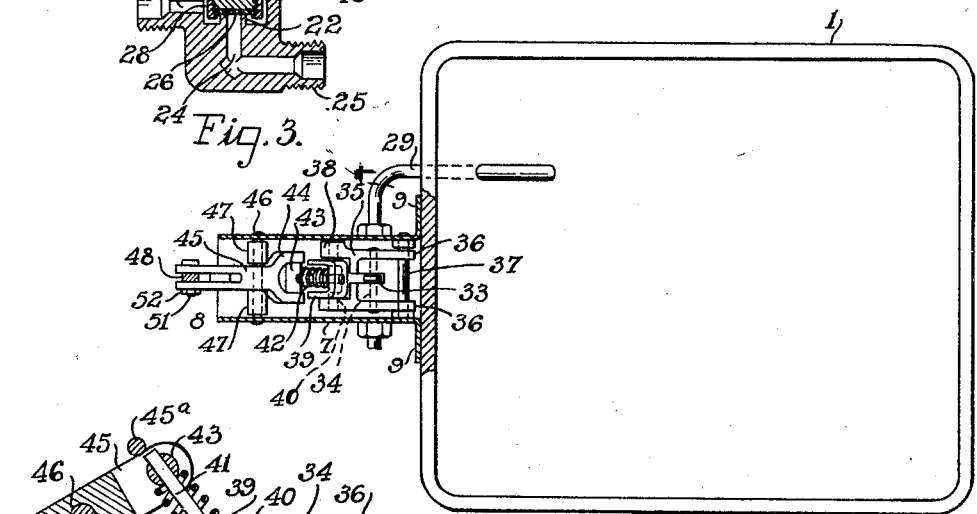
Fig.2.
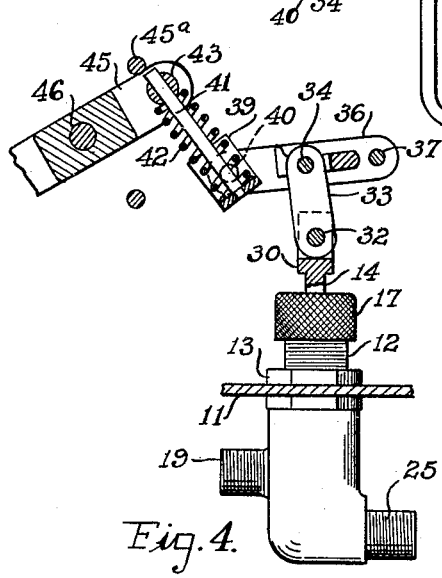
INVENTOR,
BY George R. Mumma.
Howard S. Smith
ATTORNEY Patented Aug. 27, 1929.

1,725,820

UNITED STATES PATENT OFFICE.

GEORGE R. MUMMA, OF DAYTON, OHIO.

QUICK-ACTION FLOAT VALVE.

Application filed September 12, 1928. Serial No. 305,444.

This invention relates to new and useful improvements in quick action float valves.

It is the principal object of my invention to provide a non-leaking float valve for use in connection with the water pans of furnaces and other liquid containers.

One difficulty with the ordinary type of float valve, which this invention seeks to overcome, is that as soon as the float moves, there is a small seepage of water that cuts the valve seat. This continual seepage of water past the valve wears it away.

My improved float valve, on the other hand, is either open or closed; it is never in a part way position. Therefore, it will not leak and its life will be prolonged.

Other important and incidental objects will be brought out in the following specification and particularly set forth in the subjoined claims.

In the accompanying drawings illustrating my invention, Figure 1 is a longitudinal sectional view, showing the float down and the valve open. Figure 2 is a top plan view, partly in section on the line 2—2 of Figure 1. Figure 3 is a detail sectional view of the valve, showing the same closed. And Figure 4 is a view of the valve operating mechanism, showing the same in a closed position.

Referring to the accompanying drawings for a detailed description of my invention, the numeral 1 designates a fluid container such as the furnace water pan shown in Figures 1 and 2. Within this pan there is a float ball 2 secured to a lever arm 3 which is free to move vertically in a slot 4 in the pan.

The lever arm 3 is secured by a pivot pin 5 between the sides 7, 7 of a casing 8 for the valve operating mechanism to be hereinafter described. These sides 7, 7 have flanged end portions 9, 9 by which they are secured to the water pan 1 by screws 10.

Formed in the bottom 11 of the casing 8 near the pan 1, is a hole having a threaded rim into which is screwed from below, the upper threaded portion of a flanged bushing 12. The latter is held in a tight position against the bottom 11 of the casing by a lock nut 13 which engages it from above. (See Figures 1, 3 and 4.)

At its middle portion the bushing 12 is formed with a hole of reduced diameter to receive a valve rod 14 which is threaded at its lower end. The inner wall of the bushing tapers toward this central hole from both directions. Its upper tapered portion forms a seat for packing 15 that surrounds the rod between said seat and a stuffing member 16 which is forced against the packing by a cap nut 17 applied to the top part of the bushing.

Screwed onto the lower part of the bushing 12 is a head or casing 18 formed with an externally threaded outlet 19 which communicates with the central hollow portion 20 of the head through a passage 21. The latter is above the plane of a valve seat 22 formed by a narrow hollow portion 20 of the head. (See Figure 3.) With this hollow seat 22 there communicates a fluid inlet passage 24 whose outer terminus is an externally threaded projection 25 on the lower part of the head.

Adapted to engage the seat 22 to seal the inlet opening 24, is a valve which is preferably constructed as follows. Referring to Figure 3, the numeral 26 designates a round valve member such as a fibre disc. This disc 26 is at the lower end of an externally threaded cylindrical member 27 which is formed with a top hole into which the lower threaded end of the valve rod 14 is screwed. The disc 26 is held tightly against the bottom of its supporting member 27 by a flanged nut 28 to prevent communication between the inlet passage 24 and the outlet projection 19 to which there is attached a tube 29 which extends into the pan 1 to conduct water thereto when the valve is opened.

The valve assembly just described is adapted to be forcibly raised above, and closed against, the seat 22 by the following means which insure that it will not stand partly opened to permit the seepage of fluid past it when in its closed position.

Referring to Figure 3, the valve rod 14 is formed at its upper end with an enlarged cylindrical portion 30 having a central slot 31. Secured within this slot by a pin 32 is the lower end of a link 33 whose upper end is formed with a hole through which there passes a pin 34 which pivotally connects said link to a rocking member 35. The latter is formed with two rearwardly projecting arms 36, 36 which hinge on a pin 37 secured to the sides 7 of the casing. (See Figures 2 and 4.)

The member 35 terminates at its outer end in a bifurcated portion 38 within which a U piece 39 is adapted to oscillate on a pin 40. Projecting forwardly from the bottom of the U piece 39 is a guide rod 41 for a helical spring 42.

The rod 41 projects through a diametrical hole in a cylindrical member 43 pivotally connected at its ends in the bifurcated portion 44 of a lever 45. The outer end of the spring 42 bears against the cylindrical member 43 for compression by it when the lever 45 is rocked in either direction on a pin 46 connected to the sides 7, 7 of the casing. (See Figures 1 and 2.) Collars 47, 47 center the lever on the pin, and stops 45ª and 45ᵇ limit its upward and downward throw.

The outer end of the lever 45 is bifurcated as shown in Figure 2, to receive the lower end of a link 48 which is pivotally connected at its upper end by a pin 49 to the float lever arm 3. (See Figure 1.) The arms of the bifurcated outer end of the lever 45 are formed with oppositely disposed holes 50 to receive a removable fulcrum pin 51 for the lever 45. One end of the pin 51 is threaded to receive a nut 52 which may be taken off to remove the pin so that the latter may be set in those holes which will best accommodate the throw required in the valve mechanism.

When the float 2 is raised by the water admitted to the pan 1 by the open valve, the lever arm 3, through the links 48, will depress the outer end of the lever 45 to raise the cylindrical compression member 43 through which the guide rod 41 projects. When the member 43 is raised it will compress the spring 42 until said member is in alinement with a line connecting the pin 40 on which the U piece 39 is mounted and the pivot 37. After the member 43 passes above the pin 40, the compressed spring 42 will be free to snap or throw the U piece downwardly past center to violently depress the outer portion of the rocking member 35, which will as quickly force the valve disc 26 against its seat 22.

When the float 2 descends, the valve will be snapped open at the point when the cylindrical compression member 43 descends below the pin 40, at which time the U piece 39 will be thrown upwardly past center by the released spring 42 to raise the free end of the rocking member 35 which carries it. The sudden ascent of the outer part of the rocking member will raise the rod 14 to jerk the valve disc 26 from its seat 22.

It is thus seen that the valve cannot remain partly open to permit the seepage of water past it, but will be either completely closed or opened by the compression spring and associated float-operated mechanism.

I do not wish to be limited to the details of construction and arrangement herein shown and described, and any changes or modifications may be made therein within the scope of the subjoined claims.

Having described my invention, I claim:

1. In a device of the type described, a valve, a casing having a seat for said valve, a float lever pivoted intermediate its ends, a second lever pivotally connected at one end to the free end of the float lever, a rocking member adjacent the free end of the second lever for holding said valve against and away from its seat, and spring means pivotally carried by the free end of the rocking member for compression by the free end of the second lever when said lever is moved in either direction to operate the rocking member for the purpose specified.

2. In a device of the type described, a valve, a casing having a seat for said valve, a float lever pivoted intermediate its ends, a second lever pivotally connected at one end to the free end of the float lever, a rocking member adjacent the free end of the second lever for holding said valve against and away from its seat, a piece pivotally carried by said rocking member, and a spring carried by the pivoted piece for compression by said free end of the second lever when said lever is moved in either direction to operate the rocking member for the purpose specified.

3. In a device of the type described, a valve, a casing having a seat for said valve, a float lever pivoted intermediate its ends, a second lever piotally connected at one end to the free end of the float lever, a rocking member adjacent the free end of the second lever for holding said valve against and away from its seat, a U piece pivotally secured to the free end of the rocking member, and a spring carried by the U piece for compression by said free end of the second lever when said lever is moved in either direction to operate the rocking member for the purpose specified.

4. In a device of the type described, a valve, a casing having a seat for said valve, a float lever pivoted intermediate its ends, a second lever pivotally connected at one end to the free end of the float lever, a casing in which said second lever is pivoted, a rocking member pivotally secured at its inner end within said casing and formed at its outer end with a bifurcated portion near the free end of the second lever which is also bifurcated, a cylindrical member pivotally secured in the bifurcated end of the second lever and formed with a diametric hole, a U piece pivotally secured within the bifurcated end of the rocking member, a guide rod projecting from the bottom of the U piece through the diametric hole in the cylindrical member, jointed means connecting the rocking member and the valve for raising the latter from, and forcing it against its seat, and a helical spring on the guide rod of the U member for compression by the cylindrical member carried by the second lever when said lever is moved in either direction to operate the rocking member for the purpose specified.

In witness whereof I have hereunto set my hand this 11th day of September, 1928.

GEORGE R. MUMMA.